(12) United States Patent
Kulkarni

(10) Patent No.: US 11,876,471 B2
(45) Date of Patent: Jan. 16, 2024

(54) MOTOR CONTROLLER INCLUDING RESONANT CONTROLLERS

(71) Applicant: Texas Instruments Incorporated, Dallas, TX (US)

(72) Inventor: Prasad Kulkarni, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/358,147

(22) Filed: Jun. 25, 2021

(65) Prior Publication Data

US 2022/0416713 A1 Dec. 29, 2022

(51) Int. Cl.
*H02P 27/16* (2006.01)
*H02P 27/14* (2006.01)
*H02M 1/12* (2006.01)

(52) U.S. Cl.
CPC ............ *H02P 27/16* (2013.01); *H02M 1/126* (2013.01); *H02P 27/14* (2013.01)

(58) Field of Classification Search
CPC .......... H02P 27/16; H02P 27/14; H02M 1/126
See application file for complete search history.

(56) References Cited

U.S. PATENT DOCUMENTS

| | | | | |
|---|---|---|---|---|
| 6,710,495 B2 * | 3/2004 | Lipo | ................... | H02K 3/28 310/184 |
| 7,768,220 B2 * | 8/2010 | Schulz | ................... | H02P 29/50 318/443 |
| 7,986,117 B2 * | 7/2011 | Yamamoto | ............ | B60L 15/025 318/434 |
| 2007/0052381 A1 * | 3/2007 | Ueda | .................... | B62D 5/0472 318/432 |
| 2009/0237014 A1 * | 9/2009 | Yamada | .................. | H02P 21/16 318/400.23 |
| 2011/0298405 A1 * | 12/2011 | Costanzo | ................ | H02P 29/50 318/400.23 |
| 2014/0021894 A1 | 1/2014 | Simili | | |
| 2015/0365038 A1 * | 12/2015 | Saha | ................. | H02M 7/53873 318/139 |
| 2018/0234043 A1 | 8/2018 | Hustedt et al. | | |

FOREIGN PATENT DOCUMENTS

JP 2020156223 A 9/2020
KR 101405237 B1 6/2014

OTHER PUBLICATIONS

International Search Report in corresponding PCT Application No. PCT/US2022/035051, dated Oct. 21, 2022 (3 pages).

* cited by examiner

*Primary Examiner* — Rina I Duda
(74) *Attorney, Agent, or Firm* — John R. Pessetto; Frank D. Cimino

(57) ABSTRACT

A motor controller integrated circuit (IC) includes a storage device containing software. The IC also includes a processor core coupled to the storage device. The processor core has an output adapted to be coupled to a motor. The processor core is configured to execute the software to implement a resonant controller at a frequency that is a harmonic of a speed of a motor.

20 Claims, 10 Drawing Sheets

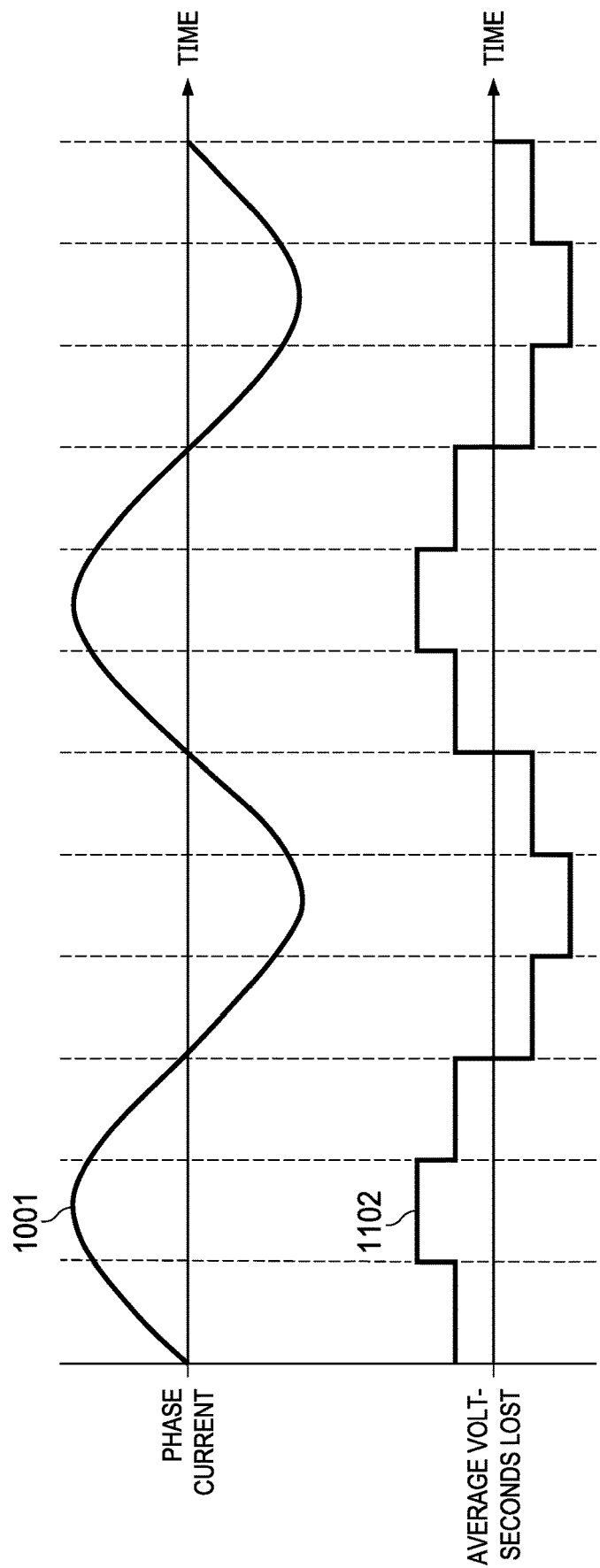

MOTOR CONTROLLER INCLUDING RESONANT CONTROLLERS

BACKGROUND

Many types and configurations of electric motors are available including, for example, direct current (DC) motors and alternating current (AC) motors. AC motors are available in various types as well including, for example, three-phase motors. A three-phase motor includes, for example, three pairs of stator windings. Three sinusoidal currents, one for each pair of stator windings, are generated by, for example, a DC-to-AC inverter. The three sinusoidal currents are 120 degrees out-of-phase with respect to each other. With reference to a first of the sinusoidal currents, a second current is 120 degrees out-of-phase, and a third current is 240 degrees out-of-phase with respect to the first of the sinusoidal currents.

SUMMARY

In one example, a motor controller integrated circuit (IC) includes a storage device containing software. The IC also includes a processor core coupled to the storage device. The processor core has an output adapted to be coupled to a motor. The processor core is configured to execute the software to implement a resonant controller at a frequency that is a harmonic of a speed of a motor.

In another example, a motor controller integrated circuit (IC) includes a three-phase inverter operable to be coupled to a motor. The IC includes circuitry coupled to the three-phase inverter. The circuitry is configured to convert sense current signals from a motor to a signal in a rotating reference frame, to implements a resonant controller on the signal in the rotating reference frame, and to generate an output signal for control of the motor using an output from the resonant controller.

In yet another example, a method for controlling a motor includes converting sense current signals from the motor to a rotational signal in a rotating reference frame and attenuating, by a resonant controller, a portion of the rotational signal at a harmonic of the speed of the motor. The method also includes generating an output signal for control of the motor using an output from the resonant controller.

BRIEF DESCRIPTION OF THE DRAWINGS

For a detailed description of various examples, reference will now be made to the accompanying drawings in which:

FIGS. 10 and 11 are waveforms illustrating volt-seconds lost due to dead time implemented in the circuit of FIG. 7.

The same reference numbers and/or reference designators are used below to designate the same or similar (functionally and/or structurally) features.

DETAILED DESCRIPTION

Figure 1:
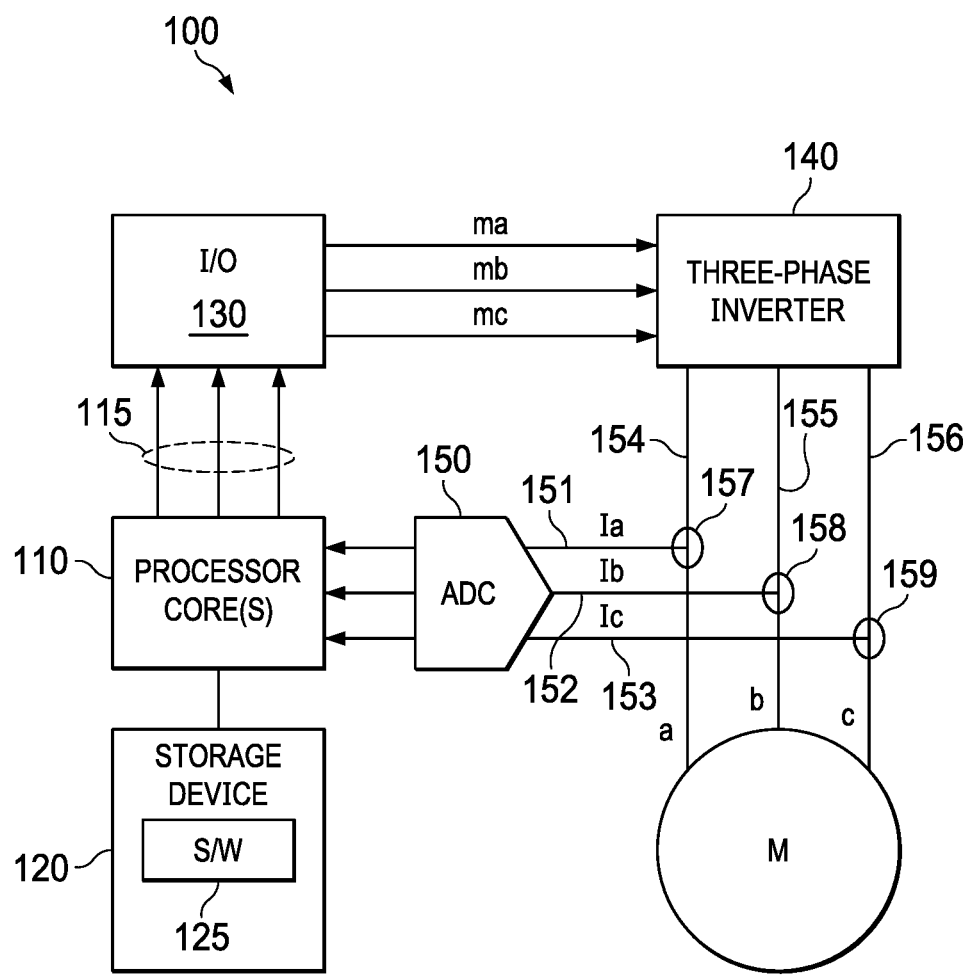
FIG. 1 is a block diagram of a motor and a system for controlling the motor in accordance with an example.

FIG. 1 is a block diagram of a three-phase motor system 100. The motor system 100 includes a processor core 110, a storage device 120, an input/output (I/O) interface 130, an analog-to-digital converter (ADC) 150, a three-phase inverter 140, and a motor M. The processor core 110 is coupled to the storage device 120 and executes software 125 stored in the storage device 120. Storage device 120 is a non-transitory storage device such as volatile memory (e.g., random access memory) or non-volatile memory (e.g., read-only memory), or combinations thereof. While a single processor core 110 is shown in FIG. 1, other embodiments include multiple processor cores that collectively execute the software 125. The processor core 110 implements the functionality described herein upon execution of software 125. The motor M includes three phases a, b, and c, and each phase has a pair of stator windings that receives a sinusoidal, or approximately sinusoidal, current from the three-phase inverter 140. Phases a, b, and c receive sinusoidal currents 154, 155, and 156, respectively, from the three-phase inverter 140.

The I/O interface 130 and the ADC 150 also are coupled to the processor core 110. The processor core 110 generates control signals on signal lines 115 that the I/O interface 130 outputs to the three-phase inverter 140 as signals ma, mb, and mc. The I/O interface 130 may include buffers to drive signals ma, mb, and mc to the three-phase inverter 140. As explained below, the three-phase inverter 140 includes a pair of transistor switches (a high side transistor coupled to a low side transistor at a switch node) for each of the three phases a, b, and c. Each of the signals ma, mb and mc from the processor core 110 is used by the inverter 140 to implement the duty cycle for the respective high side and low side transistors. The duty cycle for the high side transistor is 1+m/2, where m is the respective value of ma, mb, or mc. The duty cycle for the corresponding low side transistor is $$1 - \frac{1+m}{2}.$$

The values of m (and thus the duty cycle values) are varied sinusoidally by the processor core 110. By varying the duty cycles of each pair of transistors over time in a sinusoidal fashion for each phase, a sinusoidal current for that phase is generated.

The ADC 150 receives analog signals Ia 151, Ib 152, and Ic 153 from current sensors 157, 158, and 159, respectively. Analog signals Ia, Ib, and Ic represent (e.g., are directly proportional to) the instantaneous currents 154, 155, and 156 of the three phases a, b, and c, respectively. In one example, each of analog signals Ia, Ib and Ic is a voltage proportional to the instantaneous magnitude of its respective phase current 154-156.

In one embodiment, the processor core 110, storage device 120, I/O interface 130, and ADC 140 are fabricated on the same integrated circuit (IC) (e.g. on a single semiconductor die or multiple semiconductor dies that are interconnected within a IC package). In another embodiment, the storage device 120 may be fabricated on an IC separate from the IC that includes the processor core 110, I/O interface 130, inverter 140, and ADC 150. In general, any two or more of the processor core 110, storage device 120, I/O interface 130, inverter 140, and ADC 150 can be fabricated on the same IC. In another embodiment, the three-phase inverter 140 may be implemented on the same semiconductor die as the other circuit elements or can be fabricated on a separate semiconductor die but incorporated into the same IC package/module as the other circuit structures.

In one example, the processor core 110, upon execution of software 125, implements a field-oriented control (FOC) technique for controlling the operation of motor M. The FOC technique described below separately controls the torque and magnetic flux components of the motor's stator current.

Figure 2:
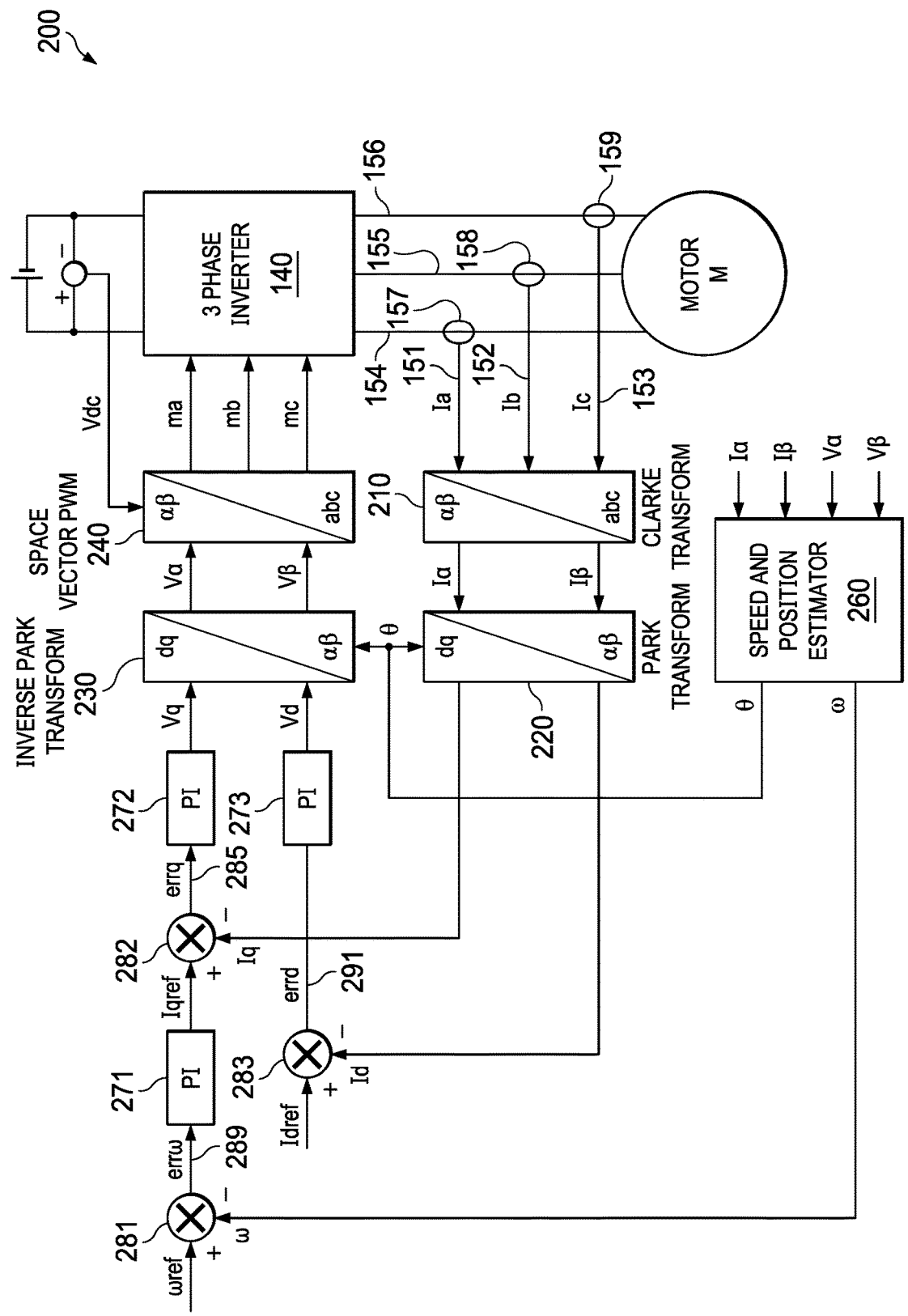
FIG. 2 is a functional block diagram of a field-oriented control technique for controlling the motor in accordance with an example.

FIG. 2 is a functional block diagram 200 of the software 125 for implementing the FOC technique. In alternative embodiments, the functional blocks included in FIG. 2 may be implemented using any combination of circuitry (e.g. processors, microprocessors, microcontrollers, state machines, ADC, DAC, flip-flops, registers, and/or logic circuits) and/or software. The block diagram of FIG. 2 includes a Clarke transform 210, a Park transform 220, an inverse Park transform 230, and a space vector pulse width modulator (PWM) 240. The space vector PWM 240 includes an inverse Clarke transform. The block diagram 200 further includes a speed and position estimator 260, proportional integral (PI) controllers 271, 272, and 273, and subtractors 281, 282, and 283. The digital values from ADC 150 (ADC 150 is not shown in FIG. 2) corresponding to analog signals Ia, Ib, and Ic are provided as inputs to the Clarke transform 210. In some embodiments, two of the three analog signals Ia-Ic (their digital equivalents) are used by the Clarke transform 210, as explained below. Each of the current sensors 157-159 may be implemented as a sense resistor included within each of the inverter's three phases. The sense resistors may be coupled to a low side switch within the respective phase (shown in FIG. 7, described below). Current flows through the sense resistor only when the respective low side switch is on. Because the low side switch and its high side switch counterpart are reciprocally turned on and off at a sinusoidally varying duty cycle (explained below), during a portion of each switching period, the low side switch is off. When the low side switch is off, no current flows through the sense resistor and thus that phase's sense current signal (Ia-Ic) is not available for use by the Clarke transform. Accordingly, two of the sense current signals are used by the Clarke transform, with the selection varying as to which two sense current signals are to be used at any point in time.

The Clarke transform 210 projects the three-phase system (Ia, Ib, Ic) into a two-dimensional ($\alpha$, $\beta$) orthogonal system. The Clarke transform 210 implements the following equations to convert Ia and Ib to I$\alpha$ and I$\beta$. Currents Ia and Ib are assumed to be the two selected currents in Eq. (1), but in general, Eq. (1) uses any two of the three currents Ia, Ib and Ic.

$$\begin{cases} I\alpha = Ia \\ I\beta = \frac{1}{\sqrt{3}} * Ia + \frac{2}{\sqrt{3}} * Ib \end{cases} \quad (1)$$

Figure 3:
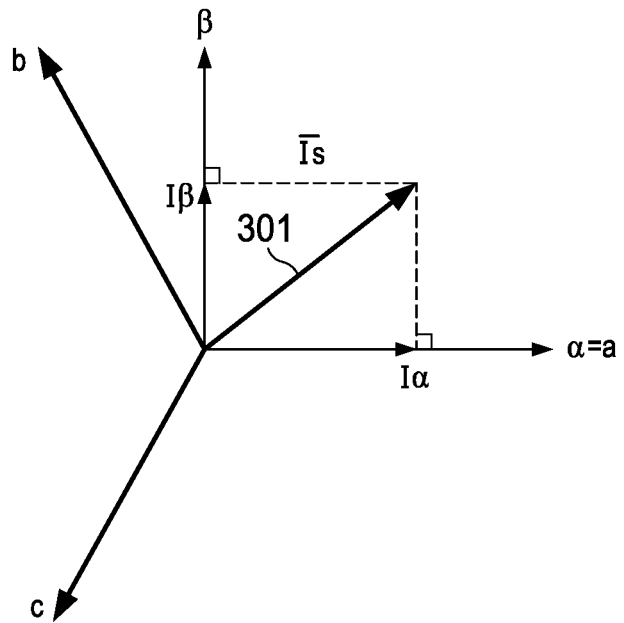
FIG. 3 is a vector diagram illustrating the relationship between the time-domain motor sense currents and an orthogonal reference implemented by the Clarke transformation.

FIG. 3 shows the relationship between the three-phase a, b, c coordinate system and the two-dimensional ($\alpha$, $\beta$) orthogonal system. Currents Ia-Ic are 120 degrees out of phase with respect to each other and are on the respective a-c axes in FIG. 3. Current vector I$\alpha$ is in-line with the a-axis (the a and $\alpha$-axes are colinear) and current vector I$\beta$ is along the $\beta$-axis. The $\beta$-axis is orthogonal to the $\alpha$-axis. Vector 301 is the complex stator current vector (Is) which is the vector sum of I$\alpha$ and I$\beta$ and thus is a mathematical combination (per Eq. (1)) of the motor's current signals Ia and Ib.

Figure 4:
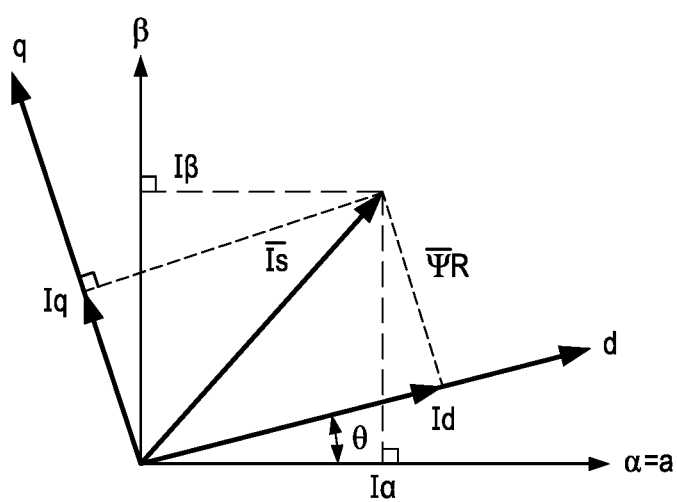
FIG. 4 is a vector diagram illustrating the relationship between the orthogonal reference implemented by the Clarke transformation and a rotating reference frame implemented by the Park transformation.

The Clarke transform 210 outputs I$\alpha$ and I$\beta$ as inputs to the Park transform 220. The Park transform 220 projects the ($\alpha$, $\beta$) orthogonal system onto a rotating reference frame (d,q) as shown in FIG. 4. The rotating reference frame is a reference frame that spins at a constant angular speed, which may or may not be same as the speed of the rotor. For permanent magnet synchronous motors, for example, the speed of the rotating reference frame is the same as rotor speed and the d-axis of the rotating reference frame aligns with the d-axis of the rotor. Accordingly, the d-axis of the rotating reference frame is aligned with the rotor's flux. The angle $\theta$ between the a-axis and the d-axis is the rotor flux position. The rotor flux position $\theta$ is computed by the speed and position estimator 260 and is provided to the Park transform 220. The q-axis is aligned with rotor torque. Based on I$\alpha$ and I$\beta$, in one embodiment, the Park transform 220 computes the flux (Id) and torque (Iq) components in the (d,q) domain as follows:

$$\begin{cases} Id = I\alpha * \cos(\theta) + I\beta * \sin(\theta) \\ Iq = -I\alpha * \sin(\theta) + I\beta * \cos(\theta) \end{cases} \quad (2)$$

The flux component id and the torque component iq are the outputs of the Park transform 220 and depend on the current vector components (I$\alpha$, I$\beta$) and on the rotor flux position $\theta$. Per the FOC control technique, processor core 110 controls the flux current component (Id) and the torque current component (Iq) independently.

The speed and position estimator 260 receives as inputs the outputs I$\alpha$ and I$\beta$ from the Clarke transform 210, as well as signals V$\alpha$ and V$\beta$ which are output values from the inverse Park transform 230. Using the values of I$\alpha$, I$\beta$, V$\alpha$, and V$\beta$, the speed and position estimator 260 computes the back electromotive force (EMF), and then using the computed back EMF, computes rotor speed w and flux position $\theta$. In one embodiment, the speed and position estimator 260 computes the back EMF in the $\alpha$, $\beta$ reference frame $$\begin{bmatrix} E\alpha \\ E\beta \end{bmatrix}$$

using the following equation:

$$\begin{bmatrix} E\alpha \\ E\beta \end{bmatrix} = \begin{bmatrix} V\alpha \\ V\beta \end{bmatrix} - \left(rs * \begin{bmatrix} I\alpha \\ I\beta \end{bmatrix}\right) - \frac{d}{dt}\left(\begin{bmatrix} L\alpha\alpha & L\alpha\beta \\ L\beta\alpha & L\beta\beta \end{bmatrix} * \begin{bmatrix} I\alpha \\ I\beta \end{bmatrix}\right) \quad (3)$$

where rs is the motor's resistance and $$\begin{bmatrix} L\alpha\alpha & L\alpha\beta \\ L\beta\alpha & L\beta\beta \end{bmatrix} = \begin{bmatrix} L0 + L1*\cos(2\theta) & L1*\sin(2\theta) \\ L1*\sin(2\theta) & L0 - L1*\cos(2\theta) \end{bmatrix}.$$

The speed and position estimator computes rotor position θ, but the preceding equation for computing $$\begin{bmatrix} L\alpha \\ L\beta \end{bmatrix}$$

uses rotor position θ. The assumption is that the motor's inductance does not appreciably change very quickly (e.g., within one sampling instance) and thus the rotor position θ previously computed by the speed and position estimator 260 is used to compute the current value of motor inductance $$\begin{bmatrix} L\alpha \\ L\beta \end{bmatrix}.$$

The inductance value $$L0 = \frac{Ld + Lq}{2} \text{ and } L1 = \frac{Ld - Lq}{2},$$

where Ld and Lq are the d- and q-axis inductances, respectively. In one embodiment, the speed and position estimator 260 then computes the back EMF in the d,q rotating reference frame based on the back EMF in the α, β reference frame and then computes rotor speed and flux position as provided in equations 4-6.

$$\begin{bmatrix} Ed \\ Eq \end{bmatrix} = \begin{bmatrix} \cos(\theta) & \sin(2\theta) \\ -\sin(\theta) & \cos(\theta) \end{bmatrix} * \begin{bmatrix} E\alpha \\ E\beta \end{bmatrix} \quad (4)$$

$$\omega = \frac{1}{Ke} * (Eq - \text{sgn}(\omega) * Ed) \quad (5)$$

$$\theta = \int \omega * dt \quad (6)$$

The subtractor 281 subtracts the rotor speed w from a reference speed value ωref (the target speed for the motor and generated by the processor core 110) to produce an error value errω 289. The error value errω 289 is an input to the PI controller 271. The PI controllers 271-273 are control loop software modules that employ feedback. In general, a PI controller repeatedly receives an error value that is the difference between a desired setpoint (e.g., reference speed value ωref in the case of PI controller 271) and a measured process variable (e.g., rotor speed w), and generates an adjustment for another process variable based on proportional and integral terms. For example, in the case of the PI controller 271, the generated adjustment is War which is applied to Iq by subtractor 282 to generate output value errq 285. The PI controllers 271-273 are digital controllers that implement the following equation:

$$u(t)=Kp+Ki/s \quad (7)$$

where u(t) is the ratio of the output value to the input value (e.g., an error value) from a PI controller, Kp is a proportional gain, Ki is an integral gain, s is the Laplace variable. A PI controller includes a proportional component and an integral component. The proportional component operates on the present value of the error while the integral component operates on previous error values. The proportional component ensures that the steady state error becomes small, but generally cannot ensure the error to be zero. However, because it operates on present error values, the proportional component converges relatively quickly. The integral component ensures that steady state error becomes zero. However, because it operates on previous values of error (error history), it converges more slowly than the proportional component. In general, the proportional component of a PI controller reduces the error to a relatively low value, and the integral component further reduces the error to zero. The speed at which the PI controller converges and any overshoot or undershoot observed are determined by the values of the proportional gain (Kp) and the integral gain (Ki).

The outputs from the Park transform 220, Id and Iq, are flux and torque current values, respectively, in the d,q rotating reference frame. The Iq component from the Park transform is subtracted from the Idref value by subtractor 282 to produce an error value errq 285. The PI controller 272 processes the value errq to compute the voltage value Vq in the (d,q) rotating reference frame. Subtractor 283 subtracts Id from a flux reference value Idref to compute a flux error value errd 291. PI controller 273 receives error value errd 291 and outputs a voltage value Vd. The voltages Vq and Vd are the q-axis and d-axis voltages, respectively, applied to the motor so that the q-axis and d-axis currents match their respective references.

The inverse Park transform 230 transforms the rotating frame flux and torque values Vd and Vq, respectively, into the corresponding values of Vα and Vβ in the (α, β) stationary orthogonal reference frame. The rotor flux position θ from the speed and position estimator 260 is also provided to the inverse Park transform 230. In one example, the Park transform computes Vα and Vβ as:

$$V\alpha = Vd*\cos(\theta) - Vq*\sin(\theta)$$

$$V\beta = Vd*\sin(\theta) + V_q*\cos(\theta) \quad (8)$$

The values Vα and Vβ are then provided to the space vector PWM 240 which uses the values Vα and Vβ to produce the signals ma, mb, and mc that drive the three-phase inverter 140. The inverter 140 converts the voltage reference values (ma, mb, mc) to duty cycles that control the on and off states of the transistors within the respective inverter phase such that the voltage on the phase's switch node applied to the motor has an average voltage that is approximately the same as the voltage reference value (ma, mb, mc). The relationship between ma-mc and the respective duty cycle is provided above.

Figure 5:
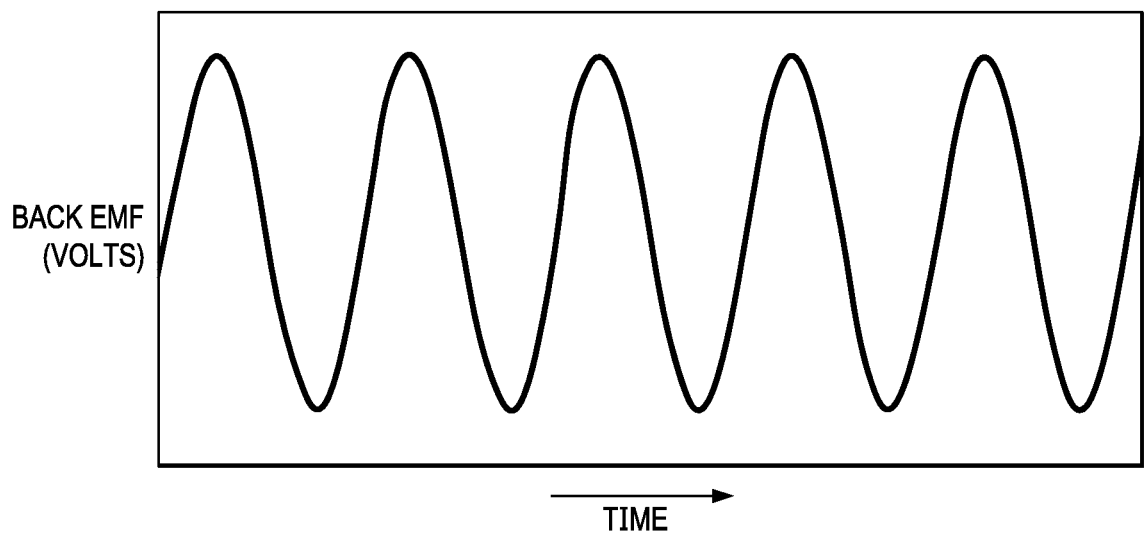
FIG. 5 is a waveform illustrating a sinusoidal back electromotive force (EMF).
Figure 6:
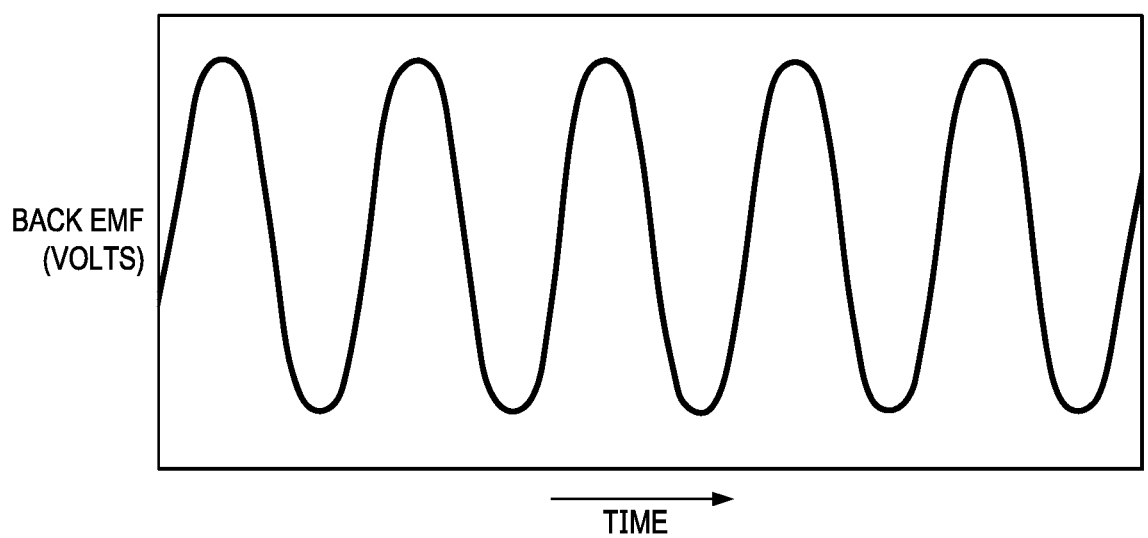
FIG. 6 is a waveform illustrating a back EMF with distortion.

While each of the three-phase currents 154-156 generated by the three-phase inverter 140 should be sinusoidal, in practice they may not be sinusoidal. One cause of a non-sinusoidal motor phase current is a non-sinusoidal back electromotive force (EMF). FIG. 5 shows a back-EMF waveform that is sinusoidal. FIG. 6 shows an example of a back EMF waveform that is not sinusoidal. The back EMF may be distorted (not sinusoidal) due to, for example, non-linearities in the motor M. Examples of motor non-linearities include windings that are not properly spaced, non-uniform magnetization of a magnet in the motor for a given pole, etc.

Figure 7:
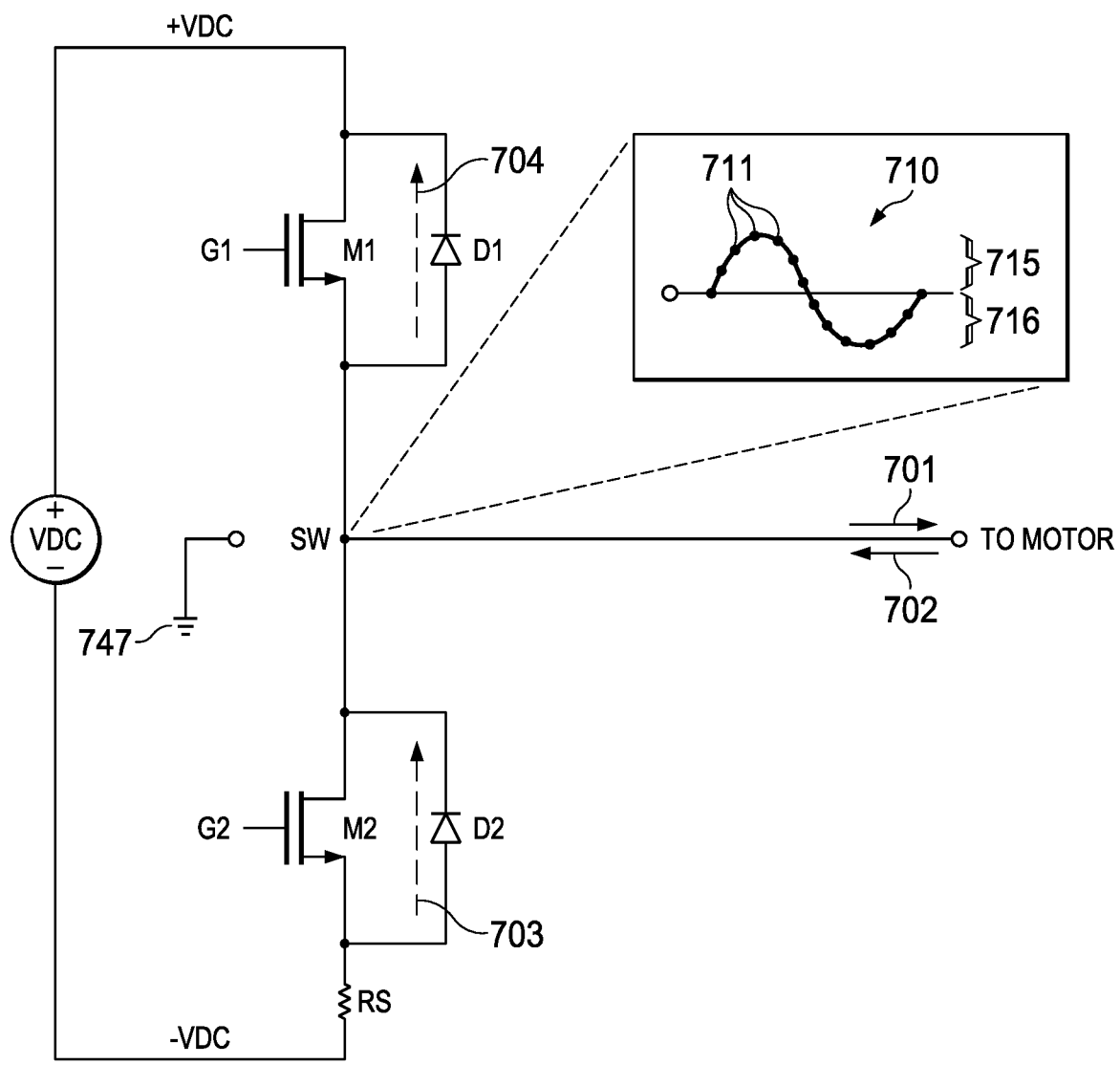
FIG. 7 is a circuit comprising one phase of a three-phase inverter in accordance with an example.

Another cause of non-sinusoidal motor phase currents stems from the three-phase inverter 140. Each phase of the three-phase inverter 140 includes a pair of transistors which are operated as switches. FIG. 7 shows an example of one phase of the three-phase inverter in which a transistor M1 is coupled to a transistor M2. In this example, transistors M1 and M2 are N-type metal-oxide semiconductor field-effect transistors (nMOS). A sense resistor Rs (e.g. a resistor with a small resistance, such as, 0.1 ohms) is coupled between the source of transistor M2 and −Vdc. The sense resistor Rs is an example of a current sensor 157, 159, and 159, because the voltage across resistor Rs is proportional to the current through transistor M2, which also is the current from the motor through transistor M2 during the negative half cycle (described below) of the motor current. The voltage across the sense resistor Rs is proportional to the sense current signal Ia-Ic. Accordingly, and as explained above, the sense current signal for a given phase is available only when that phase's low side transistor (M2) is on.

Voltage Vdc is applied across the series combination of transistors M1 and M2. Switch node SW is the connection between the transistors M1 and M2 and is coupled to a respective phase (a, b, or c) of the motor M. The body diodes D1 and D2 for transistors M1 and M2 are shown as well. The anode of body diode D1 is coupled to switch node SW and the cathode of body diode D1 is coupled to +Vdc. The cathode of body diode D2 is coupled to switch node SW and the anode of body diode D2 is coupled to −Vdc. Voltage 747 is the midpoint voltage of the DC bus (Vdc). Voltage 747 is a voltage that is half-way between +Vdc and −Vdc. The other two phases are configured similarly, that is, a pair of transistors coupled to Vdc with the switch node SW coupled to a respective phase of the motor M.

The gate signal to transistor M1 is labeled G1 and the gate signal to transistor M2 is labeled G2. The gate signals G1 and G2 are generated by the inverter 140 based on the respective ma-mc signal from the space vector PWM 240. The relationship between the duty cycles of the gate signals G1 and G2 for a given phase based on the corresponding "m" value (ma, mb, and mc) from the space vector PWM 240 is provided above. Logic (not shown) converts the values of ma-mc to gate signals G1 and G2 for the transistors M1 and M2 of the respective phases. When transistor M1 is on, switch node SW is pulled up to voltage +Vdc. When transistor M2 is on, switch node SW is pulled down to voltage −Vdc. When the gate signal G1 turns on transistor M1, the gate signal G2 turns off transistor M2. Similarly, when the gate signal G2 turns on transistor M2, the gate signal G1 turns off transistor M1. That is, only one of the transistors M1 and M2 are on at any point in time. Transistors M1 and M2 should not be turned on at the same time to avoid a shoot-through condition.

Figure 8:
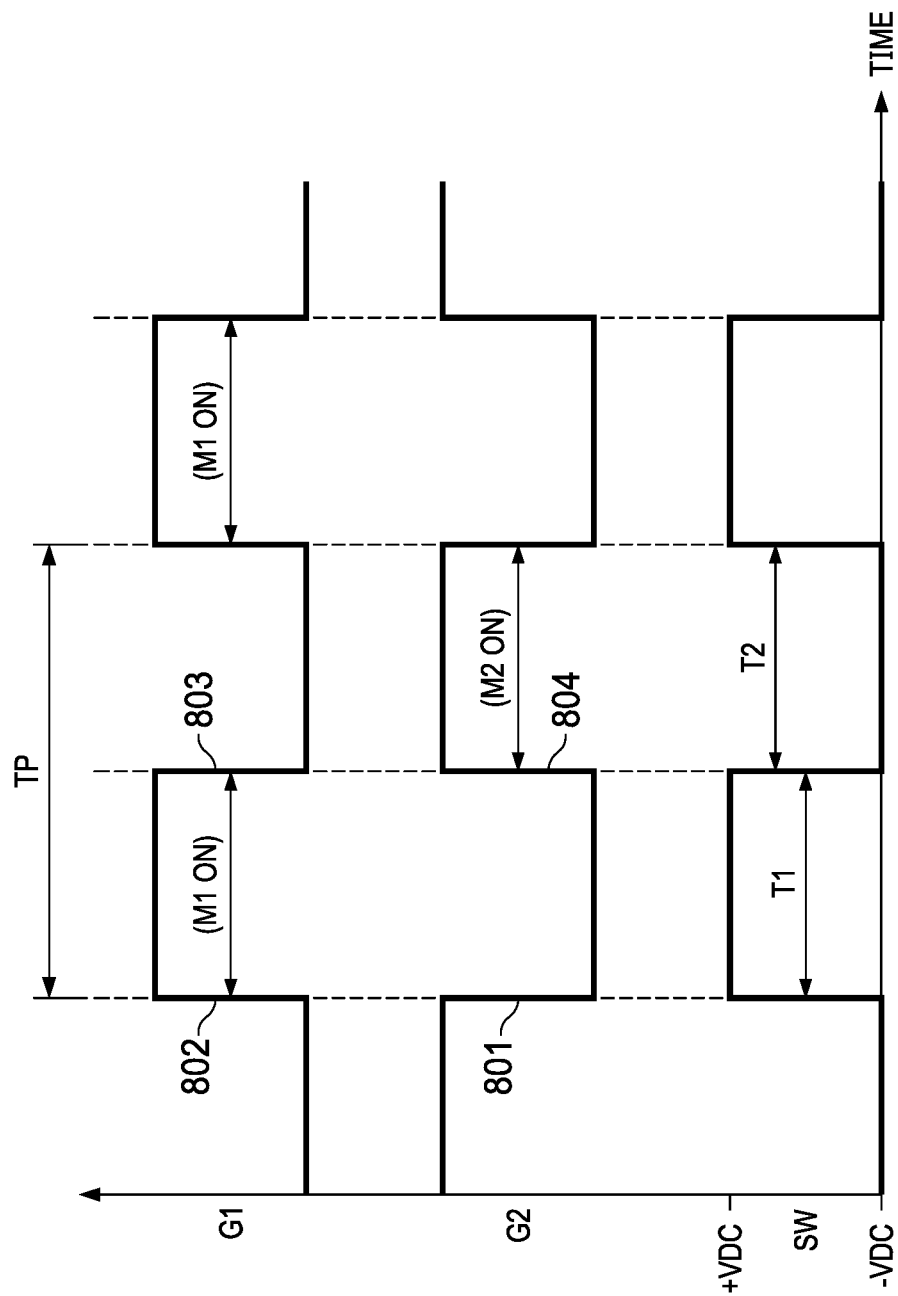
FIGS. 8 and 9 are waveforms depicting gate voltages and switch node voltages of the circuit of FIG. 7 in accordance with various examples.

FIG. 8 is a timing diagram showing the gate signals G1 and G2. In this case, each gate signal toggles between a lower voltage level and a higher voltage level. The respective transistor (transistor M1 for gate signal G1, and transistor M2 for gate signal G2) is turned on, in this example, when its gate signal is at the higher voltage level. As shown, coincident with the gate signal G2 being turned off at falling edge 801, gate signal G1 is turned on at rising edge 802. Similarly, when gate signal G1 is being turned off at falling edge 803, gate signal G2 is turned on at rising edge 804. The voltage of the switch node SW is also shown in FIG. 8. The switch node voltage toggles between +Vdc and −Vdc with the switch node voltage being at +Vdc when transistor M1 is on and being at −Vdc when transistor M2 is on. The time period that the switch node voltage is at +Vdc is T1 and the time period that the switch node voltage is at −Vdc is T2. Each switching cycle as a period of TP. The duty cycle (D) is the percentage of time of each switching cycle that transistor M1 is on. A 50% (0.5) duty cycle is illustrated in the example of FIG. 8, and thus the T1 equals T2. At other levels of duty cycles T1 will be different than T2. For example, for a duty cycle of 0.75, M1 is on for three-fourths of the switching period TP. For a duty cycle of 0.25, M1 is on for one-fourth of the switching period TP.

During each switching period TP in FIG. 8, transistor M1 is on and then transistor M2 is on. The average voltage on switch node SW is D*Vdc. By varying the duty cycle, D, the space vector PWM 240 can control the average voltage on switch node SW. Accordingly, an approximation of a sinusoidal voltage can be generated on the switch node SW by the space vector PWM 240 varying the duty cycle D in a sinusoidal manner. In this manner, the inverter 140 produces an approximately sinusoidal voltage and current for each phase of the three-phase motor M. An example of such a sinusoidal switch node voltage is shown in FIG. 7 as waveform 710. The switch node voltage progresses through a series of sinusoidally changing voltages 711 along the waveform 710. For each voltage 711, the space vector PWM 240 adjusts the duty cycle D to produce that particular voltage. During each positive half-cycle 715 of the switch node voltage waveform, current flows from the switch node SW to the motor M in the direction of arrow 701. During each negative half-cycle 716, current flows from the motor M back to the switch node SW in the direction of arrow 702. To produce a positive average switch node voltage (e.g., during positive half-cycle 715), the duty cycle must be greater than 0.5 and thus transistor M1 will be on for a longer period of time that M2 is on for each switching period. The larger the duty cycle is above 0.5, the larger will be the average positive switch node voltage. To produce a negative average switch node voltage (e.g., during negative half-cycle 715), the duty cycle must be smaller than 0.5 and thus transistor M2 will be on for a longer period of time that M1 is on for each switching period. The smaller the duty cycle is below 0.5, the larger will be the average negative switch node voltage.

Figure 9:
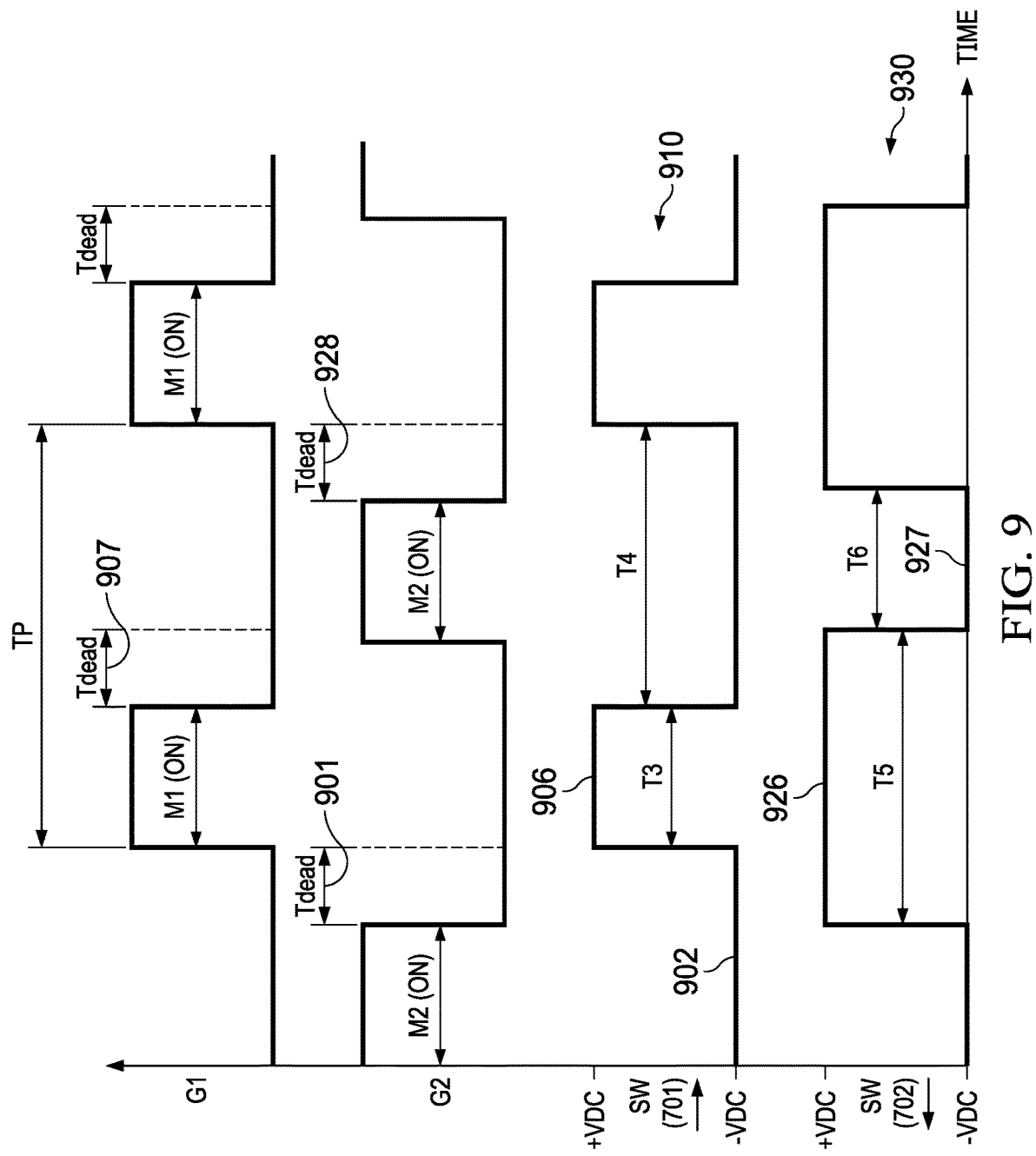

Both switches S1 and S2 for a given phase of the inverter should not be on at the same time, otherwise a "shoot-through" condition would exist in which a high level of current would flow through both transistors M1 and M2. To guard against a shoot-through condition, a "dead time" is imposed after turning off one transistor and before turning on the other transistor. FIG. 9 illustrates the dead time as the time period Tdead (not necessarily drawn to scale). During the dead time Tdead, neither transistor M1 nor M2 is on. FIG. 9 shows example waveforms for G1 and G2 for a target 50% duty cycle. G1 and G2 are active (high) for the same time period Ton. However, G1 is on for slightly less than 50% of the switching period TP due to the inclusion of deadtime. In addition, non-ideal switching of transistors M1 and M2 may cause or may be caused by non-instantaneous switching from low to high or high to low for the signals at the gates of transistor M1 and M2.

The combination of the dead time and the body diodes of the transistors M1 and M2 creates distortion in the phase currents to the motor M. As explained above, during the positive half-cycle 715 of the sinusoidal motor current for a given phase, current flows in the direction of arrow 701, and during the negative half-cycle 716, the current is in the opposing direction indicated by arrow 702. FIG. 9 illustrates two waveforms for the switch node voltage. Waveform 910 illustrates the switch node voltage during the positive half-cycle 715 of the sinusoidal phase current, and waveform 930 illustrates the switch node voltage during the negative half-cycle 716 of the sinusoidal phase current. Although the duty cycle should be greater than 50% for the positive half-cycle and less than 50% for the negative half-cycle, switch node waveforms 910 and 930 are shown for a target 50% duty cycle for simplicity.

With regard to the positive half-cycle 715 (FIG. 7), when transistor M2 is on (the gate signal G2 is high), the switch node voltage is pulled down to −Vdc, as illustrated at 902. During the ensuing deadtime (e.g., deadtime 901), due to the inductive load of the motor, current continues to flow through the body diode D2 in the direction of arrows 703 and 701 to the motor M thereby continuing to hold the switch node voltage at −Vdc. Then, when transistor M1 is on (the gate signal G1 is high), the switch node voltage is pulled up to +Vdc as shown at 906, and during the ensuing dead time 907, the current flows through body diode D2 (due to the inductive load of the motor) holding the switch node voltage SW at −Vdc. The resulting waveform 910 for the switch node voltage during the positive half-cycle has a width of T3 when the switch node voltage is at +Vdc and has a width of T4 when the switch node voltage is at −Vdc. For a target 50% duty cycle, T3 is less than 50% of the switching period TP (and smaller than T4) due to the inclusion of the dead time. As a result, the average voltage on the switch node is smaller compared to the switch node voltage absent any dead time by a voltage that is Vdc*deadtime/TP, where "deadtime" is the amount of dead time in each switching period and TP is the switching period. For example, if the amount of dead time is 5% of TP, then average switch node voltage will be reduced by 5% compared to the switch node voltage absent any dead time.

Waveform 930 shows the switch node voltage during the negative half-cycle 716 (when phase current flows in the direction of arrow 702). During the negative half-cycle, when transistor M1 is on (the gate signal G1 is high), the switch node voltage is pulled up to +Vdc, as illustrated at 926 in waveform 930. During the ensuing deadtime 907 and due to the inductive load of the motor, current continues to flow through the body diode D1 in the direction of arrows 704 and 702 from the motor M thereby continuing to hold the switch node voltage at +Vdc. When transistor M2 is on (the gate signal G2 is high), the switch node voltage is pulled down to −Vdc as shown at 927. During the ensuing dead time 928, the current flows through body diode D1 forcing the switch node voltage SW to +Vdc. The resulting waveform 930 for the switch node voltage during the negative half-cycle has a width of T5 when the switch node voltage is at +Vdc and has a width of T6 when the switch node voltage is at −Vdc. For a target 50% duty cycle, T5 is larger than 50% (and larger than T6) due to the inclusion of the dead time. The resulting average voltage on the switch node is less negative than the average voltage would have been absent the deadtime. Thus, the width of the positive pulses of the switch node voltage is different between the positive and negative half-cycles for the same duty cycle. The modulation of the duty cycle of the switch node voltage due to the inclusion of dead time results in a distortion to the phase currents provided to the motor M.

Figure 10:
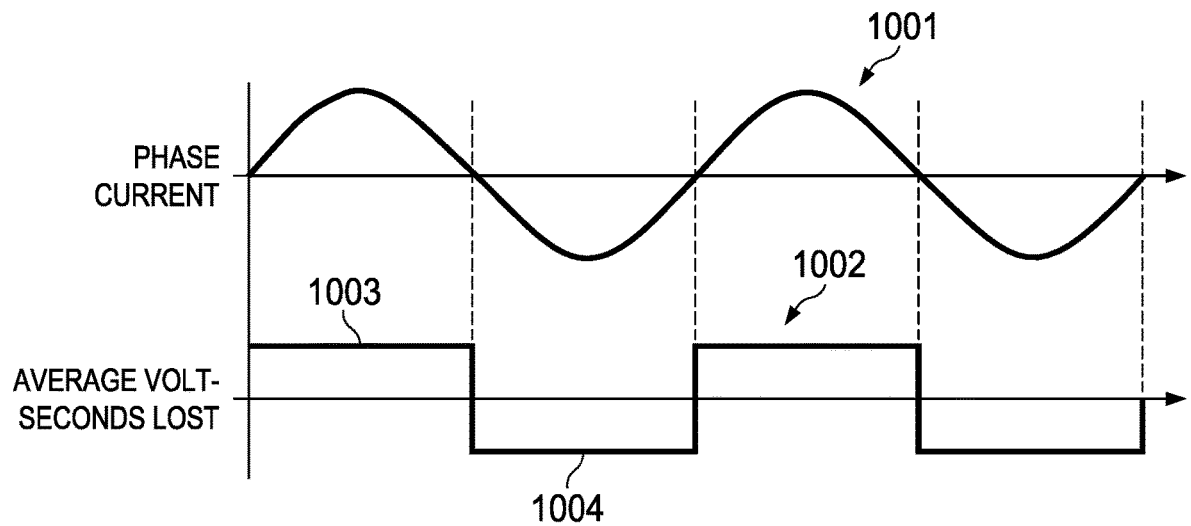

FIG. 10 shows two waveforms. Waveform 1001 is the sinusoidal current (i.e., absent any dead time) to one of the three phases of the motor M. Waveform 1002 is a square wave that represents the average volt-seconds lost. As explained above, dead time is included within each switching cycle during which neither transistor is on. The inclusion of dead time impacts the average voltage on the switch node. The average volt-seconds lost refers to the average reduction in voltage on the switch node due to the dead time and is positive during the positive half-cycle of the phase current and is negative during the negative half-cycle of the phase current as shown. Waveform 1002 is in-phase with the phase current. The phase current applied to the motor is the sinusoidal current (waveform 1001) minus the average volt-seconds lost (waveform 1002). The applied current thus has distortion at higher order harmonics due to the volt-seconds lost which results from the inclusion of dead time in each switching period.

FIG. 11 also repeats the ideal sinusoidal phase current 1001. Waveform 1102 is the superposition of the average volt-seconds lost square wave from each of the three phases. As the phase currents are 120 degrees phase shifted from each other, the volt-seconds lost square waves also are phase shifted from each other 120 degrees. The dominant harmonics of the resulting waveform 1102 are the fifth and seventh harmonics. Accordingly, analog signals Ia, Ib, and Ic have dominant harmonics at the fifth and seventh harmonics. However, after performance of the Clarke transform 210 and the Park transform 220, the dominant harmonic of the flux component Id and the torque component Iq in the (d,q) domain is at the sixth harmonic.

Figure 12:
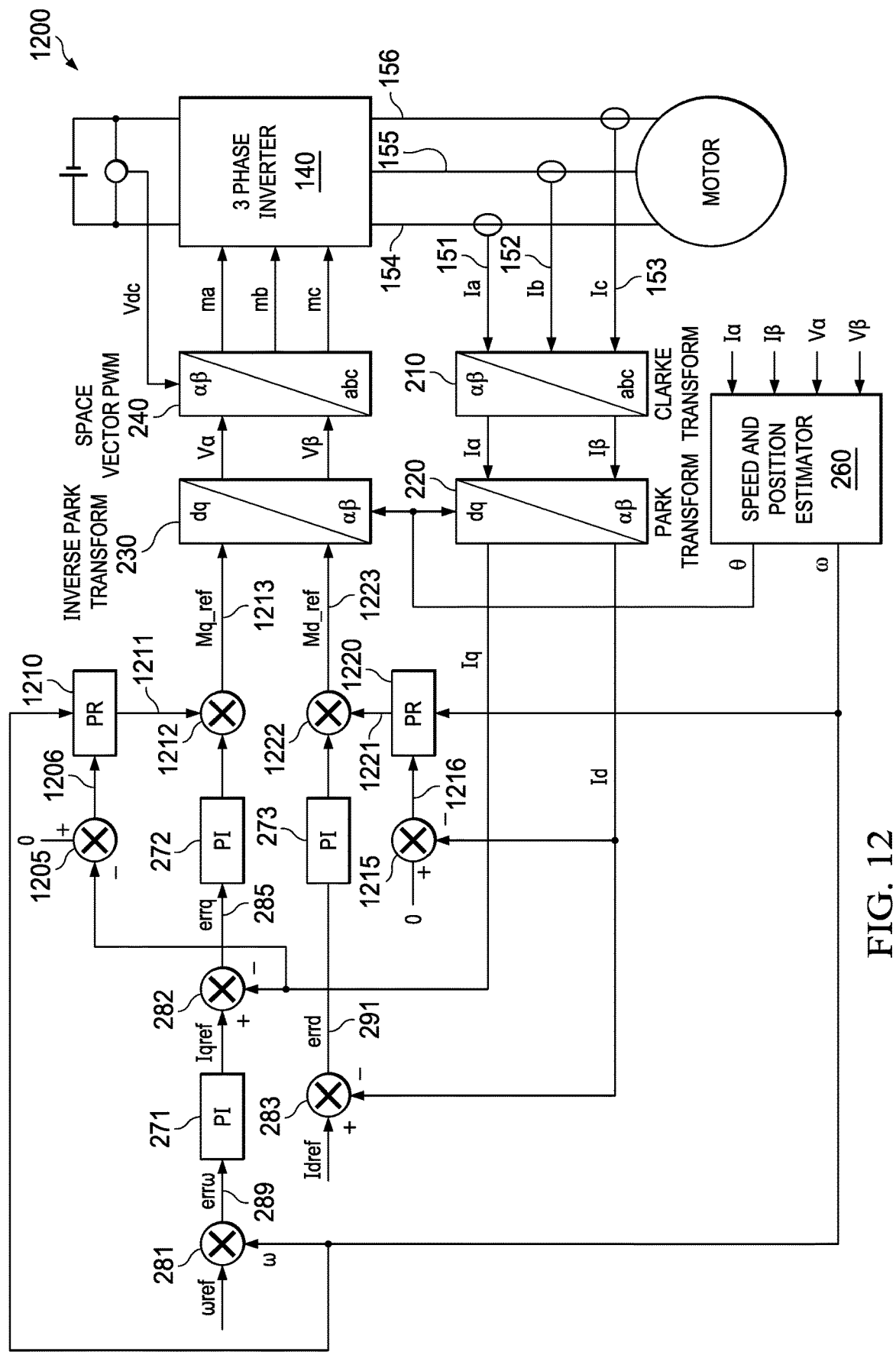
FIG. 12 is a functional block diagram of a field-oriented control technique for controlling the motor in accordance with another example.

FIG. 12 is a functional block diagram 1200 of another implementation for the software 125 for implementing an FOC technique that attenuates the signal magnitude at the sixth harmonic in the (d,q) domain. FIG. 12 includes proportional resonant (PR) controllers 1210 and 1220 for torque and flux control, respectively. A PR controller has a high gain (e.g. theoretically infinite) at a particular frequency, ω0, and a low gain (e.g., 0) at frequencies below and above ω0. Any signal amplitude at frequency ω0 is substantially attenuated by the PR controller. A continuous time domain transfer function for a PR controller is given in Eq. (9):

$$\frac{y}{r} = Kr * \frac{s}{s^2 + \omega 0^2} \tag{9}$$

where y is the output, r is in the input and Kr is resonant controller's gain, and s is the Laplace variable. To implement a PR controller in software, the transfer function of Eq. (9) can be discretized using a bilinear transform with frequency pre-warping. In accordance with a bilinear transform with frequency pre-warping, the following expression is substituted for the Laplace variable "s" in the PR controller's transfer function of Eq. (9);

$$s \leftarrow \frac{\omega 0}{\tan\left(\frac{\omega_0 T}{2}\right)} * \frac{z-1}{z+1} \tag{10}$$

In making this substitution, the implementation of the discretized resonant controller in software 125 is:

$$y = \frac{k_r \frac{Ts}{2}(r - r_{-2}) + 2\left\{1 - \left(\tan\left(\frac{\omega 0 * Ts}{2}\right)\right)^2\right\} * (y_{-1}) - \left(1 + \left(\tan\left(\frac{\omega 0 * Ts}{2}\right)\right)^2\right)(y_{-2})}{1 + \left(\tan\left(\frac{\omega 0 * Ts}{2}\right)\right)^2} \tag{11}$$

where r is the present input sample, $r_{-2}$ is the input sample that is two samples preceding the present input sample, y is the present output value, is the output sample immediately preceding the present output sample y, and $y_{-2}$ is the output sample immediately preceding $y_{-1}$.

The software block diagram of FIG. 12 includes many of the same functional elements as in FIG. 2, but also includes the PR controllers 1210 and 1220 and additional subtractors 1205, 1212, 1215, and 1222. The value Iq is provided to an inverting (−) input subtractor 1205 and a reference signal of 0 is provided to a non-inverting (+) input of subtractor 1205. Subtractor 1205 computes an error signal 1206 which is provided to an input of PR controller 1210. The output signal values 1211 from PR controller 1210 are added to the output values from PI 272 to produce a torque value Mq_ref 1213 to the inverse Park transform 230. The PR controller 1210 is programmed for an ω0 in Eq (11) equal to the frequency of the sixth harmonic of the (d,q) domain current values. The sixth harmonic frequency is six-times the rotor speed w of the motor. For example, for a rotor speed of 50 radians per second, the sixth harmonic is a frequency of 300 radians per second. In one embodiment, the rotor speed w is provided to the PR controllers 1210 and 1220, and each PR controller computes the magnitude of the sixth harmonic for use in equation 11 above (as the value ω0). In another embodiment, the speed and position estimator 260 computes the magnitude of the sixth harmonic and provides ω0 to the PR controllers 1210 and 1220.

For the flux control path, the value Id is provided to an inverting input of subtractor 1215 and a reference value of 0 is provided to the non-inverting input of the subtractor 1215. The error value 1216 is provided to an input of PR controller 1220. The output values 1221 from PR controller 1220 are added to the output values from PI 273 to produce a flux value Md ref 1223 to the inverse Park transform 230. The PR controller 1220 also is programmed for an ω0 in Eq (6) equal to the frequency of the sixth harmonic of (d,q) domain current values.

By including the PR controllers 1210 and 1220 and adding the output of the PR controllers to the output from their respective PI controllers 272 and 273, the magnitude of the sixth harmonic in the DQ domain is reduced or eliminated. Consequently, through the conversion back to the three phase currents to the motor M through the inverse Park transform 230 and the space vector PWM 240, the magnitude of the fifth and seventh harmonics in the phase currents 154-156 provided to the motor M are reduced resulting in phase currents with smaller fifth and seventh harmonic contributions. Accordingly, the resulting phase currents to the motor M are closer to true sinewaves than would have been the case without the use of the PR controllers 1210 and 1220.

Figure 13:
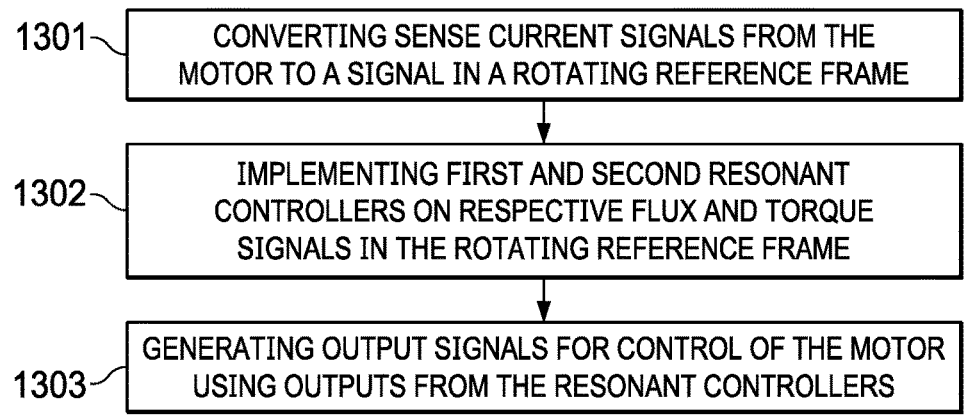
FIG. 13 is a flow chart depicting a method for controlling the motor in accordance with an example.

FIG. 13 is a flow chart of an example method 1100. In the example of FIG. 13, the method includes converting (1301) sense current signals from the motor to a signal in a rotating reference frame. In one example, this conversion is performed by, for example, performance of a Clarke transformation and a Park transformation as described above. The output signals from the Park transformation are in the rotating reference frame, and represent flux and torque signals.

At 1302, the method further includes implementing first and second resonant controllers on respective flux and torque signals in the rotating reference frame. The resonant controllers are implemented at the sixth harmonic of the motor's speed. At 1303, the method includes generating output signals for control of the motor using an output from the resonant controllers.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. As used herein, references to software functions or functional block diagrams may be implemented by software running on a processor, microcontroller or other type of processing device in conjunction with memory, in some example embodiments, or may be implemented using hardware (such as logic gates, processors, application specific integrated circuits, field programmable gate array and/or state machines), alone.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon FET ("MOSFET") may be used in place of an n-type MOSFET with little or no changes to the circuit. Furthermore, other types of transistors may be used (such as bipolar junction transistors (BJTs)).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A motor controller integrated circuit (IC), comprising:
a storage device containing software; and
a processor core coupled to the storage device, the processor core having an output adapted to be coupled to a motor, and the processor core configured to execute the software to implement:
    a first proportional integral controller configured to receive a first error input and provide a torque output, the first error input based on a torque component of a rotating reference frame representing motor sense currents;
    a second proportional integral controller configured to receive a second error input and provide a flux output, the second error input based on a flux component of the rotating reference frame;
    a first subtractor configured to receive the torque component and a first reference input and provide a first error output based on the torque component;
    a second subtractor configured to receive the flux component and a second reference input and provide a second error output based on the flux component;
    a third controller configured to receive the first error output and provide a first output representing an attenuation of a harmonic of the torque component;
    a fourth controller configured to receive the second error output and provide a second output representing the attenuation of a harmonic of the flux component;
    a third subtractor configured to receive the torque output and the first output and provide an adjusted torque output; and
    a fourth subtractor configured to receive the flux output and the second output and provide an adjusted flux output.

2. The motor controller IC of claim 1, wherein the harmonic of the torque component or the flux component or both is a sixth harmonic in the rotating reference frame.

3. The motor controller IC of claim 1, wherein the processor core is configured to convert the motor sense currents from the time domain into the rotating reference frame.

4. The motor controller IC of claim 3, wherein the processor core is configured to implement Clarke and Park transforms to convert the motor sense currents from the time domain into the rotating reference frame.

5. The motor controller IC of claim 1, wherein the first reference input or the second reference input or both has a value of 0.

6. The motor controller IC of claim 1, wherein the third controller or the fourth controller or both is configured to execute a continuous time domain transfer function of where y is an output, r is in an input and Kr is a gain of the controller, s is a Laplace variable, and $\omega 0$ is a frequency of the harmonic of the torque and/or flux component.

7. The motor controller IC of claim 1, wherein the processor is configured to compute a frequency that is a harmonic of the speed of the motor, which represents the harmonic of the torque component or the flux component or both, and to provide the frequency to the third and fourth controllers.

8. A motor controller integrated circuit (IC), comprsing:
a three-phase inverter for a motor; and
circuitry coupled to three-phase inverter, the circuit configured to:
    convert motor sense currents to a signal in a rotating reference frame having a torque component and a flux component;
    receive a first error input and provide a torque output the first error input based on the torque component;
    receive a second error input and provide flux output, the second error input based on the flux component;
    receive the torque component and a first reference input and provide a first error output based on the torque component;
    receive the flux component and a second reference input and provide a second error output based on the flux component;
    receive the first error output and provide a first output representing an attenuation of a harmonic of the torque component;
    receive the second error output and provide a second output representing the attenuation of a harmonic of the flux component;
    receive the torque output and the first output and provide an adjusted torque output; and
    receive the flux output and the second output and provide an adjusted flux output; and
    generate an output signal for control of the motor using the adjusted torque output and the adjusted flux output.

9. The motor controller IC of claim 8, wherein the harmonic of the torque component or the harmonic of the flux component or both is a harmonic of the speed of the motor.

10. The motor controller IC of claim 9, wherein the harmonic is a sixth harmonic of the speed of the motor.

11. The motor controller IC of claim 8, wherein the circuitry is configured to implement Clarke and Park transforms to convert the motor sense currents into the signal in the rotating reference frame.

12. The motor controller IC of claim 8, Wherein the first reference input or the second reference input or both has a value of 0.

13. The motor controller of claim 8, wherein the circuitry is configured to determine a harmonic of a speed of a motor, which represents the harmonic of the torque component or the flux component or both.

14. The motor controller IC of claim 8, herein the circuitry is configured to execute a continuous time domain transfer function of where y is an output, r is in an input and Kr is a gain of a controller, s is a Laplace variable, and $\omega 0$ is a frequency of the harmonic of the torque component or the flux component.

15. A method for controlling a motor, the motor rotating at a speed and the method comprising:
    converting sense current signals from the motor to a rotational signal in a rotating reference frame;
    receiving a first error input and provide a torque output, the first error input based on the torque component;
    receiving a second error input and provide a flux output, the second error input based on the flux component;

receiving the torque component and a first reference input and provide a first error output based on the torque component;

receiving the flux component and a second reference input and provide a second error output based on the flux component;

receiving the first error output and provide a first output representing an attenuation of a harmonic of the torque component;

receiving the second error output and provide a second output representing the attenuation of a harmonic of the flux component;

receiving the torque output and the first output and provide an adjusted torque output; and receive the flux output and the second output and provide an adjusted flux output; and generating an output signal for control of the motor using the adjusted torque output and the adjusted flux output.

16. The method of claim 15, wherein converting the sense current signals to the rotational signal comprises applying Park and Clarke transforms.

17. The method of claim 15, further comprising determining a speed of the motor and determining the harmonic of the torque component or the harmonic of the flux component or both to be a harmonic of the speed of the motor.

18. The method of claim 15, wherein the first reference input or the second reference input or both has a value of 0.

19. The method of claim 17, further comprising determining the harmonic of the torque component or the harmonic of the flux component or both to be a sixth harmonic of a speed of the motor.

20. The method of claim 18, further comprising executing a continuous time domain transfer function of $$\frac{y}{r} = Kr * \frac{s}{s^2 + \omega 0^2}$$

where y is an output, r is in an input and Kr is a gain of the controller, s is a Laplace variable, and ω0 is a frequency of the harmonic of the torque component or the flux component.

* * * * *